J. W. BRERETON, DEC'D.
R. K. BRERETON, EXECUTOR.
PNEUMATIC SHOCK ABSORBER.
APPLICATION FILED OCT. 7, 1921.

1,398,933.

Patented Nov. 29, 1921.

UNITED STATES PATENT OFFICE.

JOHN WESTROPP BRERETON, DECEASED, BY ROBERT KEAN BRERETON, EXECUTOR, OF ATHLONE, IRELAND.

PNEUMATIC SHOCK-ABSORBER.

1,398,933.            Specification of Letters Patent.      Patented Nov. 29, 1921.

Application filed October 7, 1921. Serial No. 506,145.

*To all whom it may concern:*

Be it known that I, ROBERT KEAN BRERETON, of Ladywell, Athlone, Co. Westmeath, Ireland, legal representative of the late JOHN WESTROPP BRERETON, do hereby declare that Pneumatic Shock-Absorbers, (for which application was filed in Great Britain, March 1, 1920, No. 6225) was invented by the said late JOHN WESTROPP BRERETON, of which the following is a specification.

This invention relates to improved pneumatic shock absorbers for the chassis or bodies of motor cars and other road vehicles, of the particular type in which pneumatic cushions are interposed between the chassis of the vehicle and the wheel axles, and are supplied with air from a pump which may be run from some moving part of the vehicle or may be actuated in a known manner by the relative motion set up between the axles and the chassis of the vehicle when inequalities are encountered in the road surface.

According to the invention I employ for the supply of air to the pneumatic cushions a double acting pump operated as above described by relative vertical motion between the chassis and axles of the vehicle, the pump drawing in and discharging air both on the actual shock caused by the inequality of the road and on the recoil. The cylinder of the pump is preferably formed with a double wall, the space between forming a reservoir into which air is pumped at each stroke of the piston. I also provide a snubbing device preferably constituted by flexible bands surrounding the pneumatic cushions by means of which undue vibration of the chassis is prevented.

Details of the invention will be pointed out with reference to the accompanying drawings which show the invention as applied to a motor car and in which:—

Similar reference letters indicate similar parts throughout the drawings.

Figure 1:
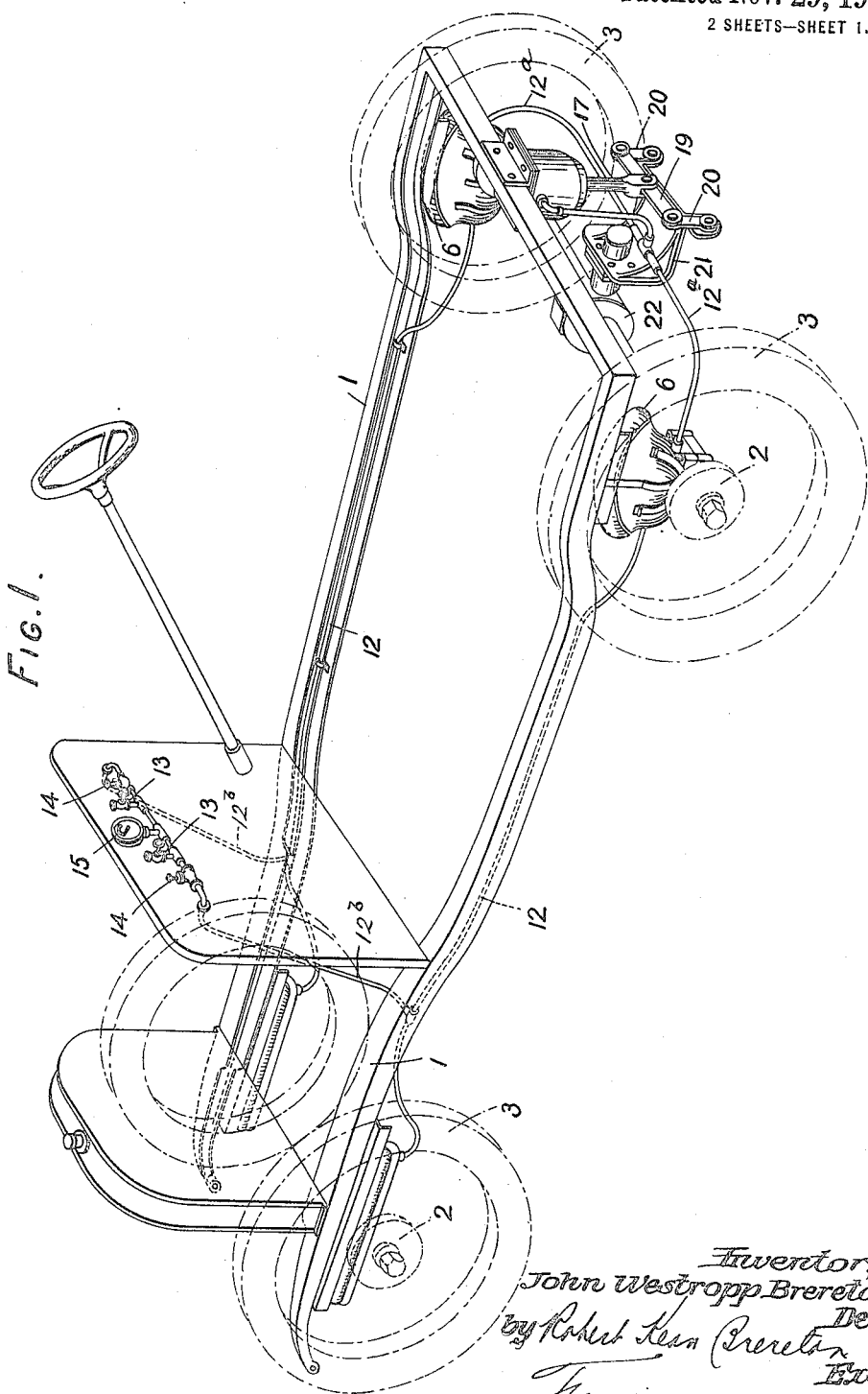
Figure 1 is a more or less diagrammatic view in perspective of the chassis and running mechanism showing my pneumatic shock absorber applied thereto.
Figure 2:
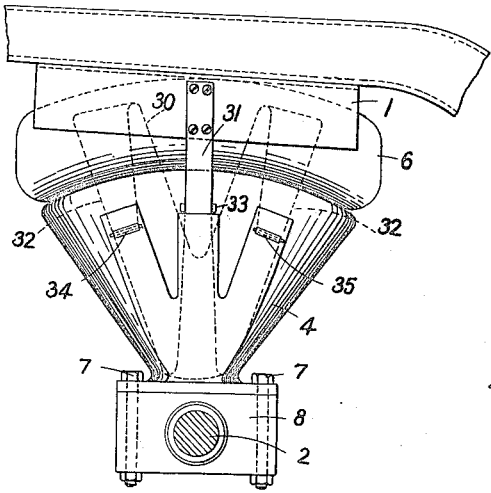
Fig. 2 is a side elevation of one of the rear shock absorbers.
Figure 3:
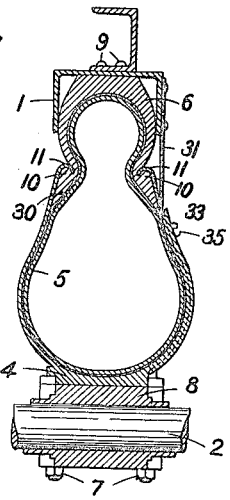
Fig. 3 is a transverse section of a shock absorber and its casing, in position between the chassis and the axle of a wheel.

Referring to the drawings, there are provided between the side bars of the frame of the chassis 1 and the axles 2 of the wheels 3, four or more casings 4, each containing an air proof bag 5, the bottom, sides and ends of the casings 4 being made of steel or other resilient material, and the top 6 upon which the longitudinal member of the chassis rests, of a flexible material, somewhat similar to an outer cover of a pneumatic tire and suitably curved where necessary. The body 4 of each casing is secured by bolts 7 to the axle journal 8 and the top 6, to the chassis 1 by rivets 9. When the air bag 5 is inflated with compressed air, the flexible top 6 forms a cushion which projects sufficiently far above the rigid body 4 of the casing, to obviate any danger of the bottom of the chassis coming in contact with such casing. The connection of the edges of the flexible top 6 to the body 4 of the casing is made by means of beaded edges 10 on the top 6 engaging with inturned flanges 11 on the body 4. Referring to Fig. 1 of the drawing it will be noted that the several cushions are connected by means of air ways or pipes 12 and cross pipes 12ª and 12ᵇ, the latter leading to the dash-board as shown, so that the pressure is the same throughout the whole system. There being present regulating valves 13 and 14 and a pressure gage 15 which may be adjusted to have the pressure throughout the system uniform and to provide means for ascertaining the said pressure. However opposite pairs of cushions may be regulated independently as will be described hereinafter.

Figure 4:
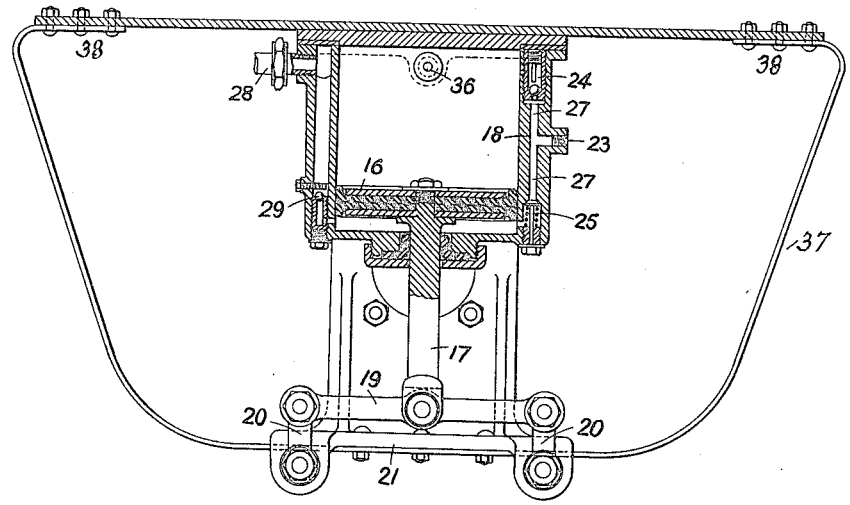
Fig. 4 is a partly sectional elevation of the air-pump.
Figure 5:
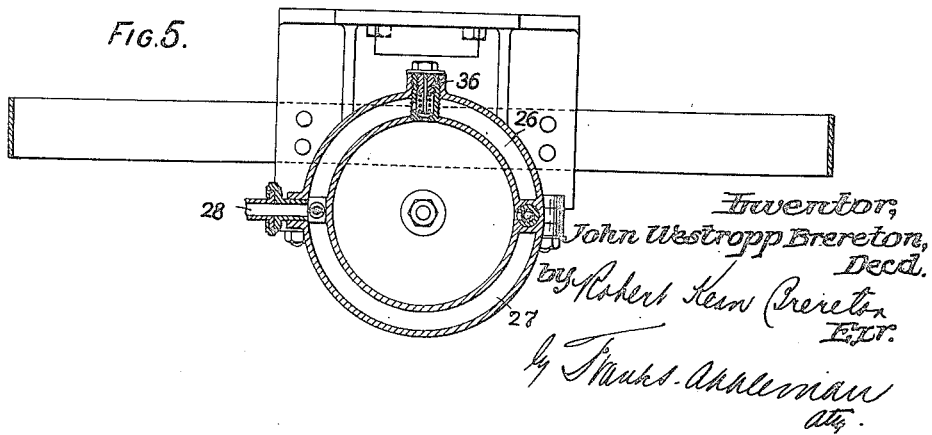
Fig. 5 is a plan showing the cylinder of the air-pump in section.

The shock absorbers of this system are supplied with compressed air by means of an air pump, Figs. 4 and 5, so designed that it is actuated automatically by the shocks produced by the contact of the wheels with inequalities of the road surface. This pump comprises a piston-head 16 its piston rod 17 which is connected by means of a bar 19 and links 20 with the rear axle 2 (Fig. 1), the piston rod being free to slide in the cylinder 18, attached to the chassis 1 in any suitable manner. As shown in the drawings, the piston rod 17 is pivoted to a cross bar 19 which itself is pivoted to links 20 secured to the frame 21 which is attached to the rear axle to extend rearward of the gear box 22, so that the frame to which the piston rod is attached will rise and fall with the rear axle 2. The cross bar, links and pivotal connections allow for any slight divergence in parallelism between the motion of the axle and chassis respectively. A spring member 37 (see Fig. 4) has its ends bolted to rear cross bar of the chassis frame at 38 and to the cross bar of the frame 21, and such spring member provides the necessary returning force between the chassis and axle after their movement toward each other. The cylinder 18 is provided with a casing so that said cylinder will be surrounded by an air chamber 26, the same having an air inlet 23 and when applied to motor cars I prefer that the air intake shall be carried by a pipe, not shown, to a point behind the radiator fan, or in any suitable position for receiving dustless air, the admission of air being aided by flaring the end of the intake pipe and positioning the same to receive air thrown back from the fan. Check valves 24 and 25 above with ports positioned and below the piston head are provided which communicate with the interior of the cylinder. The cylinder may as shown, be surrounded by an offset wall or casing to provide a space 26 constituting a storage chamber for compressed air with the air cushions by an outlet 28. The ball valve 29 allows air to escape from below the piston into the space 26 and the mushroom valve 36 permits air to escape from above the piston into the space 26. The main inlet 23 will then be in the side of the cylinder, a little below the head, and a passage 27 passing therefrom upward and downward respectively will communicate with the upper and lower part of the cylinder respectively, the upper branch being fitted with a non-return valve 24 and the downward branch with a mushroom type of valve 25.

As shown, the air discharged on both strokes of the piston head passes into a common reservoir 26. In some cases, however, separate reservoirs may be provided for the up and down strokes each being connected to the cushions on one side of the vehicle by pipes 12 as in Fig. 1, and the two separate pipe systems being cross connected by pipes 12$^a$ and 12$^b$ the latter communicating with a pipe having a central gage 15 and on each side of the latter a stop cock 13 and regulating safety valve 14. Thus by closing one of the cocks 13, the pressure in the opposite system of cushions may be observed and regulated independently of the other side.

It will be understood that in action when the wheels 3 of the motor car or other vehicle meet with an inequality in the road surface, a relative motion is set up between the chassis 1 and its axles 2. The relative motion is translated by the usual springs into a series of movements in a vertical plane which alternately increase and diminish the distance between the axles and the car body. This movement whether applied directly or multiplied through the lever connection the piston rod 17 alternately compresses the air above and below the piston and expels it into the space 26. Means may of course, be provided for the attachment of an ordinary inflating pump whereby the whole system may be filled in the first instance with compressed air, independently of the motion of the piston.

A "snubbing" device is also provided in connection with the cushions to restrict the movement of the chassis away from the axle, the same consisting of a flexible band or bands 30 which encircles each of the rubber bags 5 within the casings 4. For convenience, these bands each have an elongation 31 which are secured to the side bars of the chassis to restrict its upward movement or the distance that it may move away from the axle. The rear casings or shock absorbers will be provided on their outer sides with reinforcements 32 which diverge upward, and the lower portions thereof are overlaid by resilient diverging members having rollers 34 and 35 that engage with the respective outer faces of the reinforcements, and resist lateral extension of the outer lower portion of the cushion. In use any excessive shock will be overcome by the tightening of the encircling portion 30 by excessive movement of the chassis away from the axle.

The cushions that engage with the inverted U-shaped side bars of the chassis above the rear axle are preferably curved longitudinally, as shown.

It is obvious, that the constructive details of the invention may be very largely modified without departing from the spirit thereof. For instance, the number of cushions contained in any casing may be varied and the lower rigid part of the casing might be reduced to a simple rim like that of a motor car wheel, the rim of course, being carried by the axle journal or some similar part.

I claim:—

1. A pneumatic shock absorber for automobiles, comprising a plurality of inflatable cushions which are maintained between the axles and the chassis, a cylinder attached to the rear portion of the chassis to extend downward therefrom and rearward of the rear axle, a piston head for said cylinder, a piston rod attached to the head and extending therefrom downward, means for associating the lower end of the piston rod with oscillatory means carried by the rear axle said means extending downward and rearward from the axle, and means for distributing air under compression to the several cushions.

2. A pneumatic shock absorber for vehicles, comprising inflatable air cushions which are associated with the frame and the axles of the vehicle, a double acting air compressor which is attached to depend from the rear portion of the frame, a reciprocatory piston rod for said air compressor, means associated with the rear axle of the vehicle said means extending downward and rearward therefrom and including an oscillatory bar to which the piston rod is attached, and air supply pipes for conveying air under pressure to the several inflatable air cushions.

3. A pneumatic shock absorber for motor vehicles, comprising a plurality of inflatable cushions supported to be positioned above the axles and to engage the chassis at points above the axles, a forward pair of the cushions having extended horizontal upper surfaces and rear cushions the upper surfaces thereof being segmental, an air compressor actuated by movement of the vehicle and means for supplying air under compression from the air compressor to the several cushions.

4. In a shock absorber for vehicles, the combination with a plurality of pneumatic cushions which are associated with the frame and axles of the vehicle, an air compressor of the double acting pump type the cylinder thereof being attached to the rear portion of the vehicle to depend therefrom, a support associated with the rear axle and provided with a bar and end links which connect the bar with the support, means for connecting the piston rod with the bar to effect direct reciprocation of the piston rod and take-up vibrations in directions other than those in line with the center of the cylinder.

5. A pneumatic shock absorber for vehicles comprising a plurality of inflatable cushions maintained between the axles of the vehicle and its frame, an air compressor consisting of a cylinder its piston and piston rod, air inlet and exit ports, a casing which surrounds the cylinder and provides therewith a chamber for air under pressure, pipes which connect the chamber with the inflatable cushions, a support attached to the running gear of the vehicle and provided with links, a bar the ends of which are engaged by the links, and means for connecting the end of the piston rod to an intermediate portion of the bar, the parts being organized so as to provide for converting vibratory motion into reciprocatory motion.

ROBERT KEAN BRERETON,
*Executor of John Westropp Brereton, deceased.*